United States Patent [19]

Schilling et al.

[11] Patent Number: 4,621,285
[45] Date of Patent: Nov. 4, 1986

[54] PROTECTED TELEVISION SIGNAL DISTRIBUTION SYSTEM

[75] Inventors: John Schilling, Dresher; Joseph Dolinski, Upper Black Eddy, both of Pa.

[73] Assignee: Jerrold Division, General Instrument Corporation, Hatboro, Pa.

[21] Appl. No.: 215,044

[22] Filed: Dec. 10, 1980

[51] Int. Cl.⁴ ............................................. H04N 7/167
[52] U.S. Cl. .................................... 358/120; 358/122
[58] Field of Search ................. 358/117, 120, 122–124

[56] References Cited

U.S. PATENT DOCUMENTS

| | | | |
|---|---|---|---|
| 3,184,537 | 5/1965 | Court et al. | 358/120 |
| 3,530,232 | 9/1970 | Reiter et al. | 358/120 |
| 4,068,264 | 1/1978 | Pires | 358/122 |
| 4,095,258 | 6/1978 | Sperber | 358/122 |
| 4,145,717 | 3/1979 | Guif et al. | 358/120 |
| 4,163,252 | 7/1979 | Mistry et al. | 358/120 |

*Primary Examiner*—S. C. Buczinski
*Attorney, Agent, or Firm*—Hopgood, Calimafde, Kalil, Blaustein & Judlowe

[57] ABSTRACT

A television signal distribution system protects outgoing programs from unauthorized reception; and marks or tags the conveyed signals with a digital word identifying the class of viewers authorized to receive the program ("level of service"). Basic encription is accomplished by effectively suppressing the horizontal and vertical synchronizing information. Horizontal sync information, and the program-characterizing level of service word which is interleaved in time with prescribed horizontal sync pulses, is distributed via pulse amplitude modulation of the audio carrier.

At subscriber receiving stations, the sound carrier amplitude modulation is recovered to permit level of service authorization verification; and to reconstitute the video carrier to receivable form by an amplitude modulation which is the inverse of the sync-suppressing modulation of the head end.

In accordance with one feature of the present invention, a further data channel may be employed to very subscriber service authorizations—as to permit pay-per-view billing.

15 Claims, 5 Drawing Figures

SOUND CARRIER MODULATION

HEAD END

RECEIVER

HEAD END

RECEIVER

PROTECTED TELEVISION SIGNAL DISTRIBUTION SYSTEM

DISCLOSURE OF THE INVENTION

This invention relates to electronic video distribution systems and, more specifically, to a television signal distribution arrangement which is protected; and which permits selective reception of varying programs depending upon a subscriber's authorized level of service.

It is a general desideratum for operators of community antenna television (CATV) systems to augment their distribution of local and imported distant off-air signals with pay television programs. Moreover, cable operators often wish to (i) secure (e.g., encript or alter) pay or premium television programs to render them nonrecoverable by a standard television receiver; and (ii) to provide multiple levels or tiers of authorized program reception for various purposes, e.g., incremental subscriber fees.

It is an object of the present invention to provide an improved video distribution system.

More specifically, it is an object of the present invention to provide television signals which are protected against unauthorized reception; and which digitally tag distributed programs to permit selective reception in accordance with a subscriber's service authorization.

It is a further object of the instant invention to avoid signal distortion while providing such signal distribution encription and tagging; and to distribute encripted and tagged signals within normal television channel frequency bounds.

The above and other objects of the present invention are realized in a specific, illustrative television signal distribution system which protects outgoing programs from unauthorized reception; and which marks or tags the conveyed signals with a digital word identifying the class of viewers authorized to receive the program ("level of service"). Basic encription is accomplished by effectively suppressing the horizontal and vertical synchronizing information. Horizontal sync information, and the program-characterizing level of service word which is interleaved in time with prescribed horizontal sync pulses, is distributed via pulse amplitude modulation of the audio carrier.

At subscriber receiving stations, the sound carrier amplitude modulation is recovered to permit level of service authorization verification; and to reconstitute the video carrier to receivable form by an amplitude modulation which is the inverse of the sync-suppressing modulation of the head end.

In accordance with one feature of the present invention, a further data channel may be employed to vary subscriber service authorizations—as to permit pay-per-view billing.

The above and other features and advantages of the present invention will become more clear from the following detailed description of two specific illustrated embodiments thereof, presented hereinbelow in conjunction with the accompanying drawing, in which.

Figure 1:
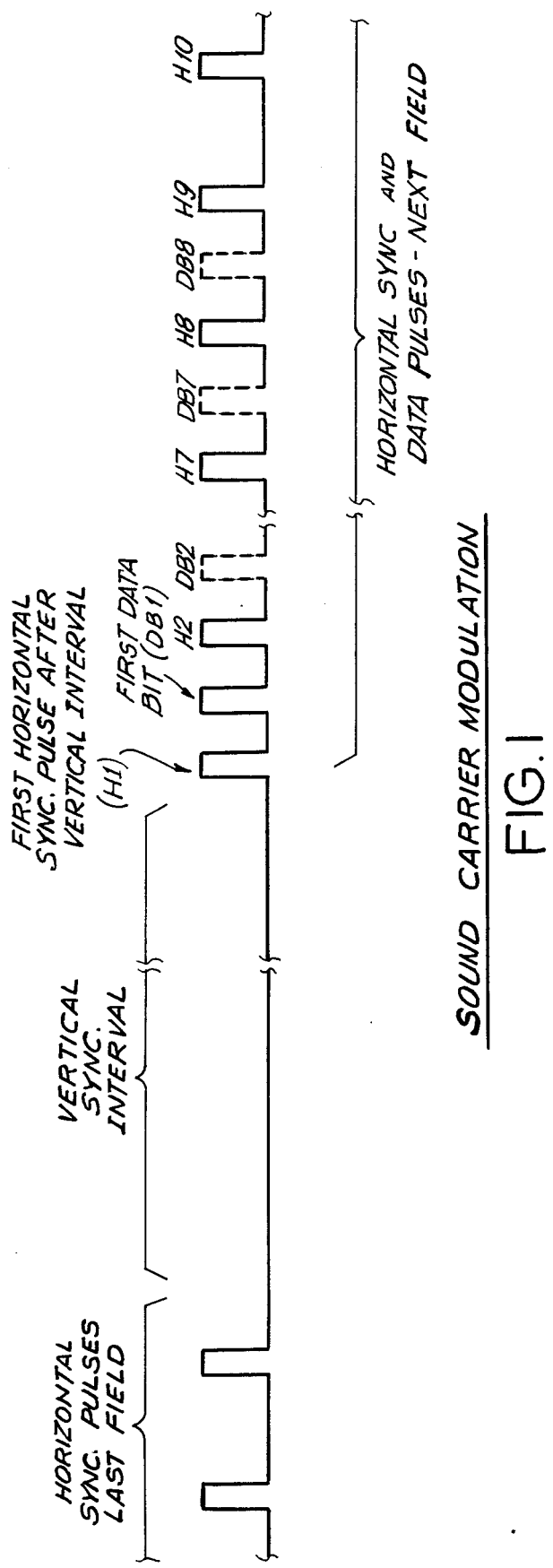
FIG. 1 is a wave form showing the pulse amplitude modulation of a channel sound carrier.

Referring first to FIG. 1, there is shown a wave form of the modulation intelligence for generating the video level or authorization tagging of the present invention; and for also communicating the time of occurrence of horizontal synchronizing pulses of a subject television signal. As will become more clear from the following, the wave form of FIG. 1 amplitude modulates the sound carrier transmitted by the head end.

In overview, the sound carrier amplitude modulation intelligence includes pulses corresponding in time to the leading portion of all horizontal synchronizing pulses of the outgoing video wave. There is no explicit transmission of any vertical sync interval information. Thus, the left portion of FIG. 1 shows horizontal sync pulses from a previous field; no amplitude modulation occurring during the entire vertical interval; and the horizontal sync pulses H1, H2 . . . in the next following field.

For level of service labelling or tagging, a digital word of plural (e.g., eight) data bits DB1, DB2, . . . , DB8 is interleaved with selected, predetermined horizontal sync pulses. For concreteness, FIG. 1 shows the data bits to follow the first eight horizontal sync pulses following the vertical interval period—and to repose approximately midway between successive horizontal pulses.

For purposes below discussed, the first data bit DB1 will always be present, i.e., will always be a binary "1". The successor data bits DB2–DB8 are shown dashed and may assume any combination of Boolean states to thereby identify one of $2^7$ or 128 levels of service. The number of data bits is arbitrary, it simply being necessary to use at least the minimal number of such bits to identify and distinguish between the ensemble of different levels of service desired.

Still by way of overview, the data bits DB1–DB8 are recovered in each subscriber receiver and the information there present compared against authorized level(s) of service stored in the subscriber's receiver. If a match is obtained, i.e., if the level of service of the incoming wave is authorized to the particular subscriber, the subscriber's receiver is enabled to permit reception of the transmitted television program.

Figure 5:
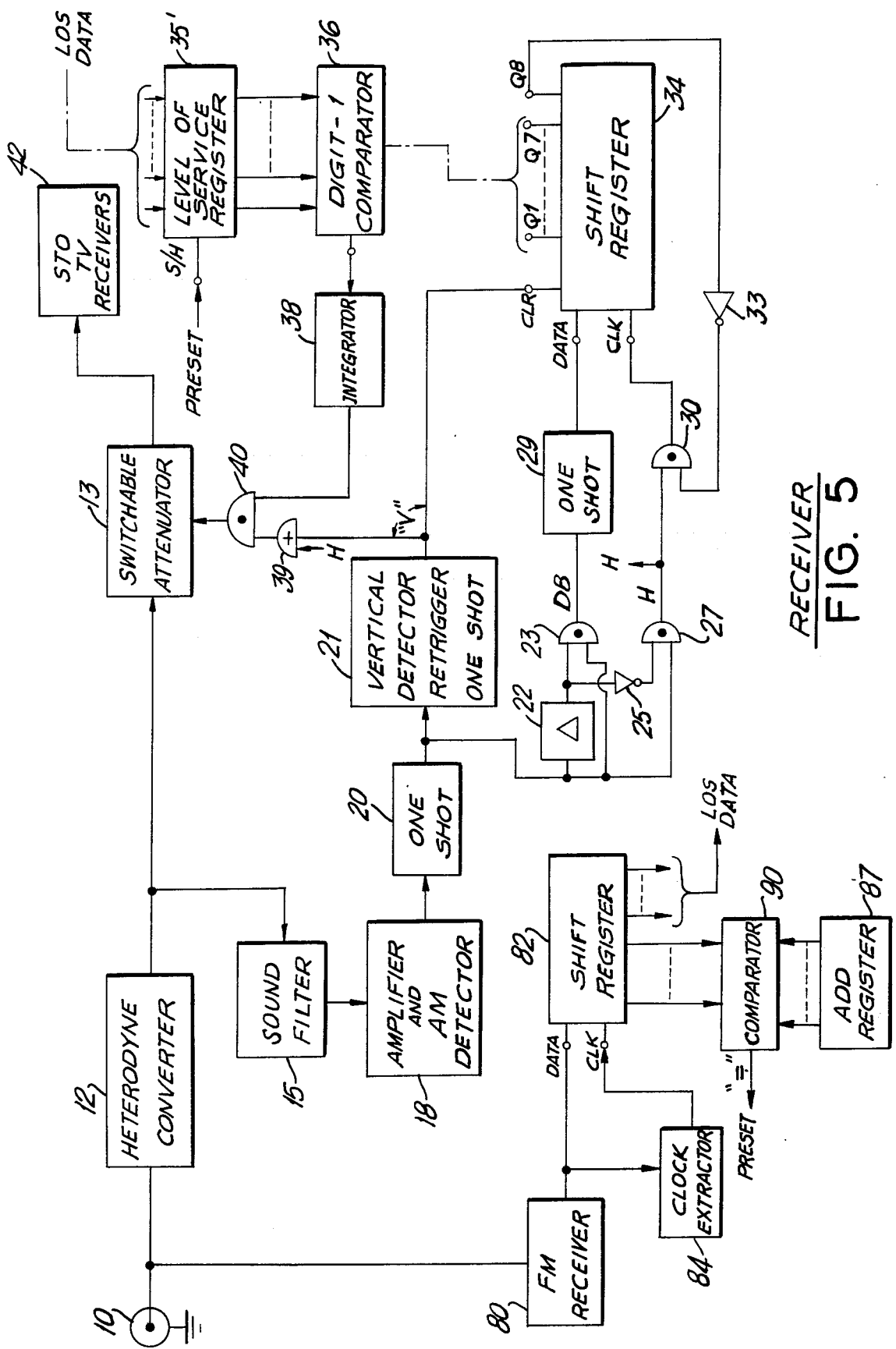
FIG. 5 is a block diagram of a receiver for recovering the transmission of the FIG. 4 head end.

It is also observed that no vertical synchronizing information is expressly transmitted by the instant invention. The vertical interval is recognized at the receiver by the absence of horizontal synchronizing pulses which are not transmitted during the vertical period—the office of the vertical period detector, retriggerable one shot circuits 21 in FIGS. 3 and 5.

Encription in the instant invention is effected by reducing the amplitude of the modulated radio frequency picture carrier during the horizontal synchronizing pulse period, and also during the vertical interval. Accordingly, standard television receivers directly connected to such a modulated picture carrier are unable to establish either vertical or horizontal synchronization with the effect that no visible picture appears on the face of the television cathode ray tube. However, subscribers equipped with receiving equipment and authorized to receive a particular program, recover the horizontal synchronizing pulses of FIG. 1 from the amplitude modulated sound carrier and, as above described, derive vertical timing information from the interruption in the train of horizontal pulses. Such recovered horizontal and vertical timing information is then used to perform an inverse amplitude modulation of the received modulated picture carrier, i.e., to enhance the signal amplitude during the synchronization periods relative to the video intelligence periods in a manner directly opposite to that effected during signal encription at the head end. With horizontal and vertical synchronizing pulses contained in the incoming video wave thus restored to their proper amplitude relative to the video picture intelligence, the composite signal is in a form to be viewed by a standard television receiver.

Figure 2:
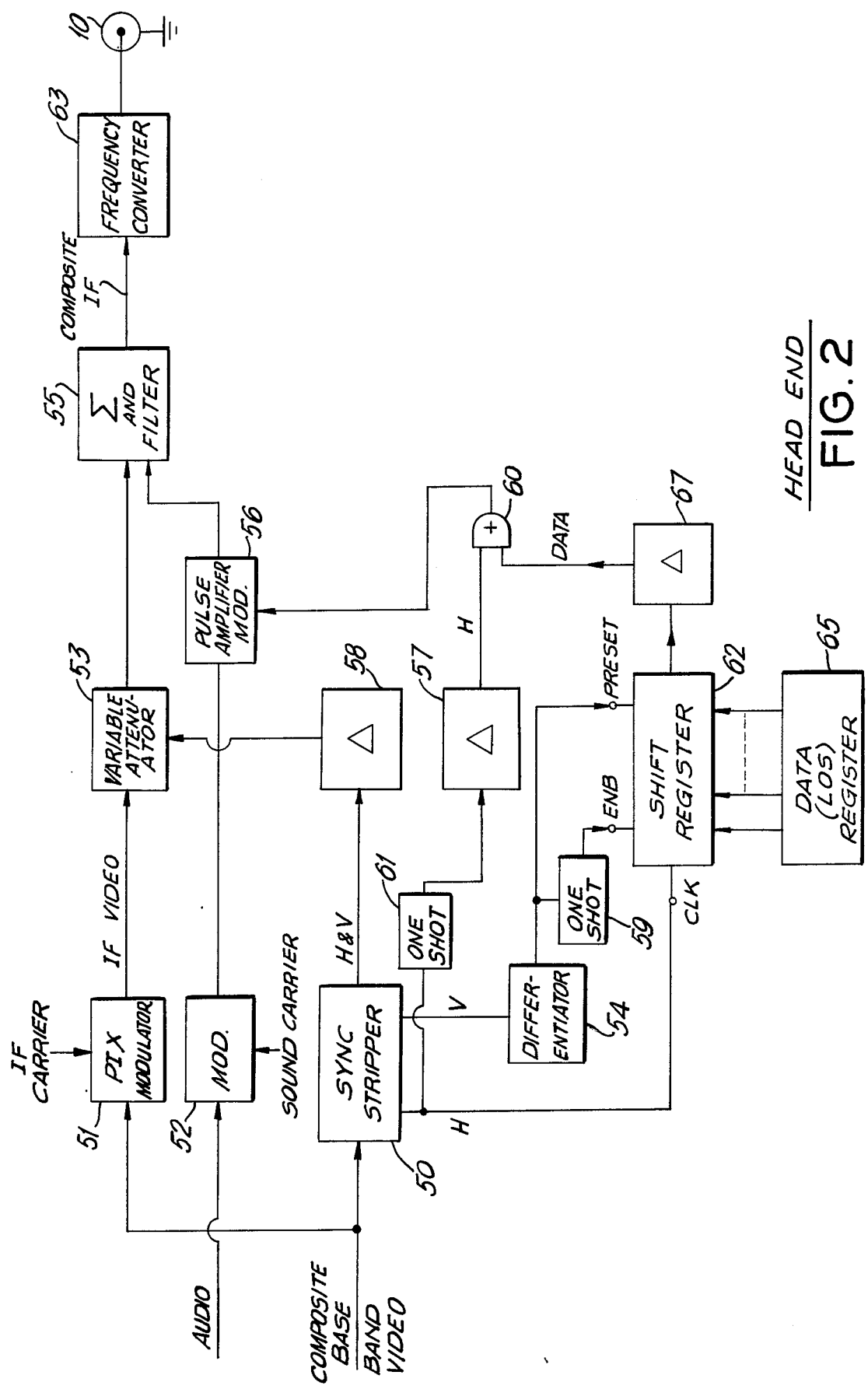
FIG. 2 shows head end circuitry for a protected video signal supplying apparatus.

With the above overview in mind, attention will now be directed to head end apparatus of FIG. 2 which implements the overall system functioning described in overview above. Composite base band video, complete with its synchronizing information, is supplied by a source thereof to a picture carrier amplitude modulator 51, the output of which is the video intelligence and synchronizing information in proper format, at intermediate frequency. The composite base band video is also supplied to sync stripper circuitry 50 which supplies on respective output leads thereof horizontal pulse timing information ("H"), vertical period timing ("V"), and a pulse train containing both horizontal and vertical information ("H" & "V"). Sync stripper circuits are well known to those skilled in the art, and may be assembled from standard integrated circuit and/or discrete components. Such sync strippers may alternatively be formed from clamp circuits followed by level detectors, all as per se well known.

The horizontal and vertical combined pulse train to the right of sync stripper 50 is delayed by a delay 58 to compensate for delays in the modulator 51, and gates a variable attenuator 53 (or alternatively, a variable gain amplifier). More specifically, the variable attenuator 53 reduces the amplitude of the amplitude modulated picture carrier output of functional block 51 whenever a horizontal synchronization or vertical period signal there obtains, e.g., by 6 db, such that the synchronizing pulse peak amplitudes become indistinct vis-a-vis the picture intelligence signal. Accordingly, the modulated picture carrier at the output of variable attenuator 53 cannot be recovered and viewed by a standard television receiver since such receivers cannot locate and respond to either the horizontal or the vertical synchronizing pulses each of which has been reduced in amplitude—and each (and both) of which defeats the ability of the receiver to present a viewable picture.

For purposes of generating the tag or level of service information, the appropriate level of service word is stored in a register 65, the output of which is coupled to preset data inputs of a shift register 62. The horizontal pulse stream output of sync stripper 50 is supplied to a clock input of the shift register 62. The trailing edge of the vertical period indicating signal "V" at the output of sync stripper 50 is differentiated and the resulting pulse supplied to a PRESET (sample/hold) control port of shift register 62 such that the register 62 is loaded with the level of service word coincident with the end of the vertical interval. Moreover, a one shot timing circuit 59 responds to the pulse signalling the end of the vertical interval by enabling the shift register 52 for a period corresponding to the time length of the data bit stream, i.e., for the period from the pulse H1 through and slightly beyond the pulse DB8 of FIG. 1. Accordingly, the horizontal pulse stream clocks the level of service word serially out of shift register 62, through a delay 67 which is equal to one-half of the time interval between horizontal pulses (which is where the data bits reside), and the resulting, delayed digital data word is supplied to the lower input of an OR gate 60. Also supplied to the OR gate 60 are the horizontal pulses, extended by a one shot circuit to their proper duration, delayed by a delay circuit 57 to account for modulation delays at the transmitter and to also equalize for the delays in the receiver electronics of FIG. 2.

The horizontal pulse and data bit stream at the output of the OR gate 60 is supplied to a pulse amplitude modulator 56. Also supplied to the modulator 56 is the audio program content which frequency modulates a sound carrier in a modulator 52. Accordingly, the output of pulse amplitude modulator 56 is the frequency modulated audio program also modulated in amplitude with the horizontal pulse timing stream and the data bits to form the modulation wave form of FIG. 1.

The modulated sound and picture carriers, each modified from normal form as above discussed, are linearly combined in a summing network and filter 55, up-converted in frequency to the desired channel allocation and impressed on the coaxial cable 10 (or other distribution medium such as over-air).

Figure 3:
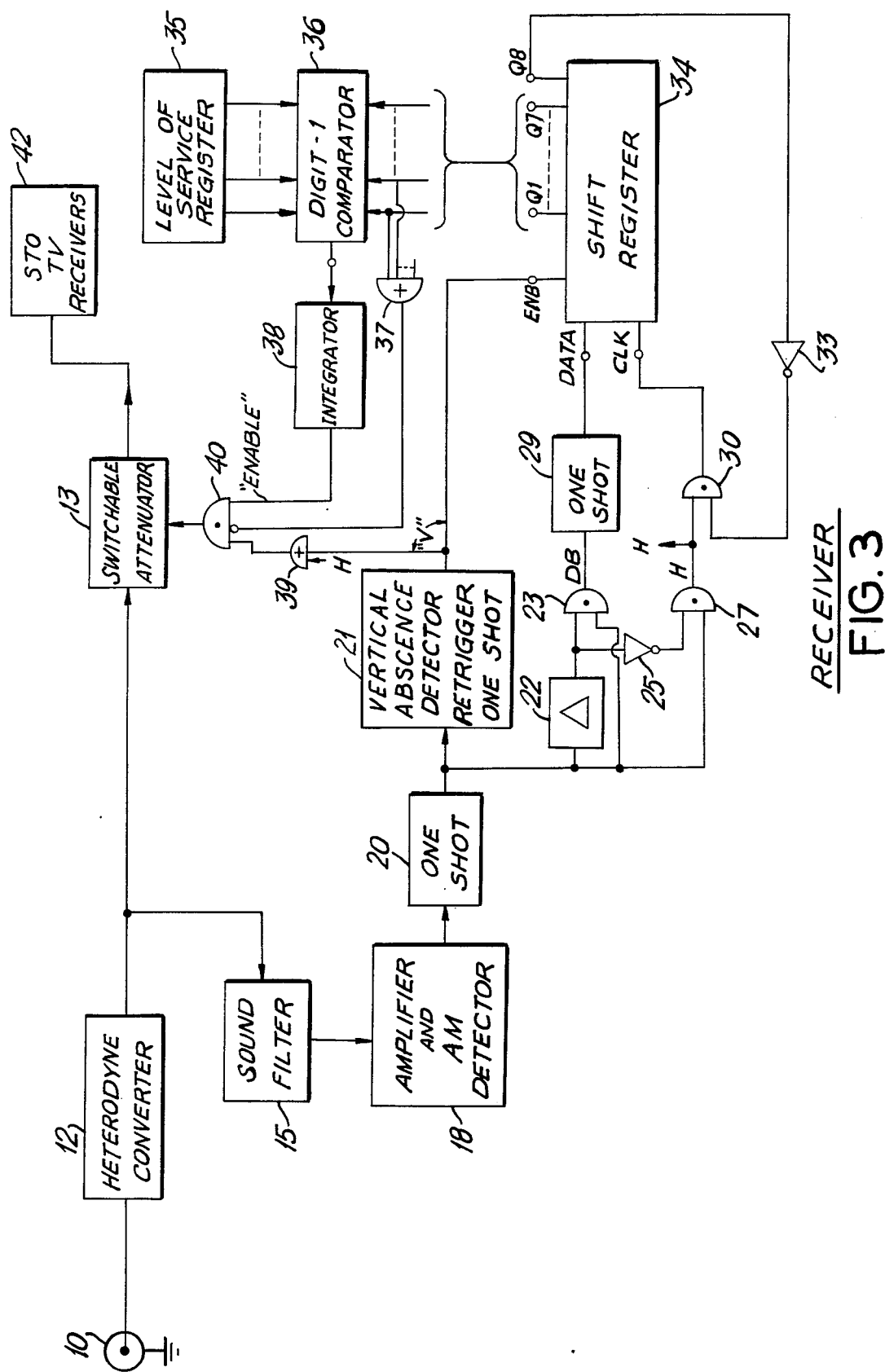
FIG. 3 is a block diagram of a subscriber-station receiver for communicating with the FIG. 2 head end.

The signal above described is received at each of the plural system receiver stations having equipment such as that shown of FIG. 3. The signal on the cable 10 is down-converted to a standard frequency allocation by a heterodyne converter 12 and supplied to the input of a switchable attenuator 13 (e.g., variable gain amplifier or variable attenuation circuit), which effects an attenuation precisely the inverse of that accomplished by the attenuator 53 of the FIG. 2 head end.

The amplitude modulated sound carrier is extracted from the component television wave by band pass filter 15 and the amplitude modulation recovered by an amplifier and amplitude modulation detector 18. The detected pulses modulating the sound carrier are extended in width by a one shot circuit 20 such that the output of the one shot circuit 20 is the series of pulses shown in FIG. 1 but extended in width.

The pulse stream at the output of one shot circuit 20 is delayed in delay 22 and supplied as one input to an AND gate 23 the other input of which is the output of the one shot circuit directly. The serial output of AND gate 23 comprises the eight data bits, the AND gate responding to the delayed data bit and the next following horizontal pulse which are now coincident in time. Similarly, the inverse of the output of the delay 22 (inverter 25) is applied to AND or coincident gate 27 with the output of one shot circuit 20 directly, the output of the gate 27 thus comprising the horizontal sync pulse timing stream.

The data bits at the output of AND gate 23 are extended in width by a one shot circuit 29 (to insure their presence at the same time as the horizontal pulses) and are applied to the data input of a shift register 34. When the vertical pulse lapses at the end of a vertical interval, the shift register 34 is enabled for data shifting (output of circuitry 21). Accordingly, with the shift register 34 in a cleared state immediately following a vertical interval, the resulting digital "0" at the last or Q8 stage output is inverted by inverter 33 to enable an AND gate 30. Thus following the vertical interval, horizontal pulses from the output of AND gate 27 pass through gate 30 and apply clock pulses to the clock input of the shift register 34. Thus, the eight data bits are shifted into the shift register 34 stages. When the first data bit (DB1 in FIG. 1) which is always a binary "1" resides in the final shift register stage, the resulting high Q8 output is inverted (gate 33) and blocks AND gate 30. Thus, after the data word is loaded in register 34 it is retained there since no further clock pulses can reach the shift register 34.

The seven operative information-bearing bits in the level of service word present at the shift register outputs Q1–Q7 are supplied as an input to a digital comparator 36. Stored in a level of service register 35 of the receiver is each level of service which the particular subscriber possessing the FIG. 3 receiver is authorized to view. If, and only if, the BCD binary word applied to the comparator 36 from shift register 34 matches an authorized level of service stored in the 35, the comparator 36 will provide an active "enable" output signal to an integrator 38. The integrator 38 is utilized such that the apparatus does not immediately respond to the temporary absence of a match output signal from comparator 36 which happens once each field while data is being loaded into register 34. The time constant of integrator 38 is, of course, sufficiently fast that if no match signal is applied over several fields, an active "enable" output of integrator 38 will disappear, thus preventing reception of the incoming signal. Accordingly, the "enable" output of integrator 38 is present to authorize signal reception if, and only if, the level of service tag borne by the incoming picture corresponds to an authorized level of service stored in the register 35.

The vertical interval signalling variable "V" is derived from the horizontal timing pulses supplied via one shot circuit 20 by a vertical detector 21, e.g., comprising a retriggerable one shot. The period of the retriggerable one shot 21 is made slightly larger than the width between two horizontal pulses. Accordingly, as long as horizontal pulses are forthcoming from the amplitude modulated sound carrier, the one shot circuit 21 is continuously reset. However, when the horizontal pulse stream disappears at the beginning of a vertical interval, the one shot circuit 21 is not retriggered and it switches to its vertical interval signalling mode.

The vertical period signal "V" is applied to an OR gate 39 together with the horizontal pulse stream "H" at the output of AND gate 27. The vertical and horizontal pulses combined at the output of OR gate 39 are furnished as inputs to an AND gate 40, together with the "enable" signal. The output of an OR gate 37 is incoming program selected by converter 12 is authorized for viewing (active "enable" signal) each horizontal or vertical pulse passing through OR gate 39 will activate coincidence gate 40 and cause a signal amplitude enhancement to the corresponding vertical or horizontal synchronizing period then present in the received picture carrier wave being supplied to the switchable attenuator 13. Thus, the picture carrier at the output of attenuator 13 is of proper format, and it is simply received by the standard television receiver 42. It is again noted that should the "enable" signal not be present, the AND gate 40 is blocked and the horizontal and vertical sync for the pulses in the received composite signal remain effectively suppressed thereby preventing picture reception by the standard television receiver 42.

Thus, the system of FIGS. 2 and 3 has been shown to implement signal encription and security by both vertical and horizontal sync suppression; and to transmit levels of service with the outgoing wave to permit only receivers authorized for that level of service to in fact view the particular programming. It is also observed that all of the signal required for signal transmission and reception are transmitted "in band", i.e., within the 6 mhz video channel without requiring an external data channel for transmission of information to reconstitute the synchronization signals. Yet further, it is observed that during the vertical interval there is no sound carrier amplitude enhancement—and the amplitude of the picture carrier is reduced. Accordingly, the composite voltage contribution of the subject video is reduced to not increase—and, indeed, to reduce distortion on the cable.

The above discussion has assumed that there are in fact 128 levels of service requiring all seven active data bits. There may be indeed be far fewer authorization levels such that some lesser number of bits is required; or there may in fact be many levels of service but only a few authorized for the subject receiver. To this end, all unnecessary outputs of shift register 34 which can never have a signal thereon for the authorization levels of the subject receiver may be connected as inputs to an OR gate 37. If a signal is ever present on one of the inputs to gate 37, signalling that there is no authorization for the subject subscriber, the active output of gate 37 is coupled to an inhibited input of AND gate 40 to block signal recovery.

Figure 4:
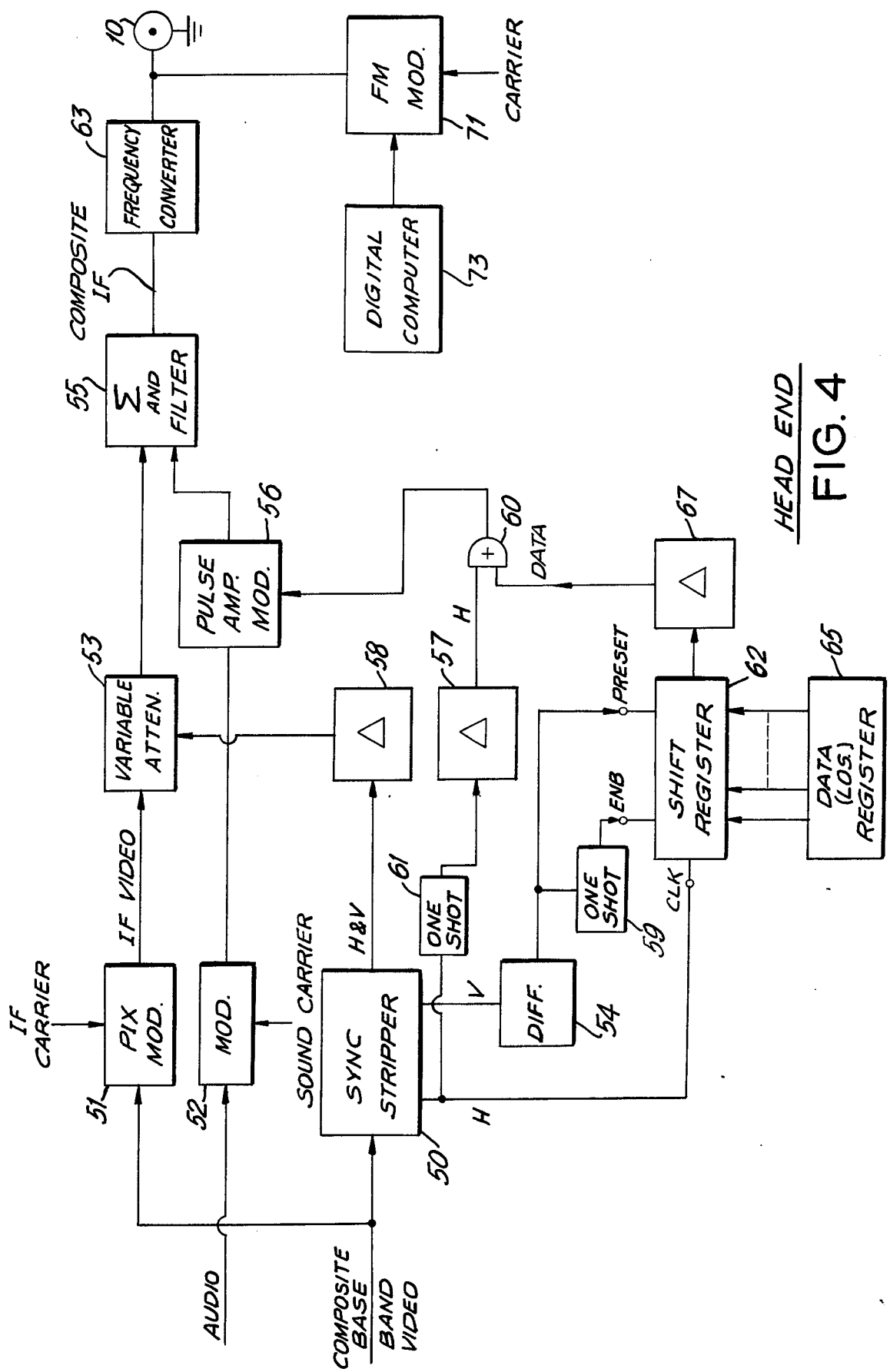
FIG. 4 is an alternate head end arrangement for providing varying level of service authorizations for system subscribers.

The head end equipment of FIG. 2 and the receiver of FIG. 3 have assumed fixed authorization levels for the system subscribers. The head end of FIG. 4 and the corresponding illustrative receiver of FIG. 5 include equipment largely duplicative of FIG. 2 and FIG. 3—but augmented to provide addressable levels of service for system receivers. The addressable communications with the receivers may take the form of extended data words of the type shown in FIG. 1. Alternatively—and as shown in the FIGS. 4 and 5 equipment, it will be assumed that there is a separate frequency modulated data channel to convey the variable authorization messages. To this end, the head end includes an additional frequency modulator 71 (FIG. 4) which is supplied with data words by the output of a digital computer 73. The information supplied by the computer 73 is assumed to be of a format comprising the address (i.e., identification number) of a particular subscriber for whom an authorization message is intended—preceded by the message itself.

At the receiver (FIG. 5) the separate data channel is recovered by an FM receiver and demodulator 80, the output of which is the digital message supplied by the computer 73 at the head end. It is assumed for convenience that the digital message is modulated in a coding which includes an embedded clock, e.g., a Manchester or return to zero code. Accordingly, the message clock is recovered by a clock extractor 84 and applied to a clock input of a shift register 82. The incoming message itself is supplied to the data input of the shift register 82 and passes through the several stages thereof.

An address register 87 permanently stores the identification number or address of the particular subscriber, this address being supplied as one input to a digital comparator 90. Also supplied to the comparator 90 is a subset of the shift register 82 stages.

When the comparator 90 notes a match between the address then stored in the shift register and that of the address register 87, it generates an "equal to" output recognition signal which is applied to a preset or sample/hold control port of the level of service register 35'. At this time also the level of service data supplied by computer 73 then reposing in other stages of shift register 82 is supplied to the preset data inputs of register 35'. Accordingly, the receiver of FIG. 5 operates in the manner above described to receive only messages addressed to it, thus utilizing variable data in the register 35' rather than the fixed authorization levels as was the case for register 35 in the FIG. 3 arrangement.

The arrangements of FIGS. 2 and 3, and 4 and 5 have thus been shown to provide secure picture video transmission; and to permit variable tiers or levels of service authorization.

The above-described arrangements are merely illustrative of the principles of the present invention. Numerous modifications and adaptations thereof will be readily apparent to those skilled in the art without departing from the spirit and scope of the present invention.

What is claimed is:

1. In combination in video distribution apparatus; signal originating means including means for transmitting a picture carrier selectively modulated in amplitude to reduce vertical and horizontal synchronizing information relative to video picture information, and means for transmitting a sound carrier modulated in amplitude with horizontal synchronizing pulse timing information except during the vertical synchronizing interval and a digital video tag interleaved with said horizontal synchronizing pulse timing information and at least one receiver coupled to said signal originating means for receiving said picture and sound carriers, each of said receivers including authorization register means, sound carrier amplitude demodulator means for recovering said horizontal synchronizing pulse timing information and said digital video tag, vertical detector means connected to said sound carrier amplitude demodulator means for recovering vertical synchronizing timing from the absence of said horizontal synchronizing pulse timing information on said sound carrier during said vertical synchronizing interval, authorization comparator means connected to said digital video tag recovering means and said authorization register means for selectively permitting video reception, and means enabled by said authorization comparator means for increasing the amplitude of said received modulated picture carrier during said horizontal and vertical synchronizing periods relative to said video picture information.

2. A combination as in claim 1 wherein said signal originating means further includes means for generating and distributing a further signal comprising address and message fields; and wherein each of said receivers further includes further signal receiving means, an address register, address recognition means responsive to a match between the transmitted address field and the contents of said address register for loading said receiver authorization register with said received message field.

3. A combination as in claim 1 or 2 wherein said picture carrier transmitting means further includes selective carrier variable transmissivity means, sync stripper means for recovering video vertical and horizontal sync timing, and means responsive to the output of said sync stripper means for controlling said variable transmissivity means.

4. A combination as in claim 3 wherein said picture carrier transmitting means further includes a tag register storing a tag word, shift register means selectively loaded with the contents of said tag register, means for clocking said tag word out of said shift register, linear combining means for interleaving said tag word and said horizontal synchronizing pulses, a sound frequency modulator, and means for amplitude modulating the output of said sound frequency modulator with the output of said linear combining means.

5. A combination as in claim 3 wherein said vertical detector means includes retriggerable monostable circuit means.

6. A combination as in claim 3 wherein said signal originating means comprises a CATV head end, and further comprising a coaxial cable connecting said head end and each of said receivers.

7. In combination in receiver means for receiving a composite transmitted television wave comprising a picture carrier selectively modulated in amplitude to reduce vertical and horizontal synchronizing information relative to video picture information, and a sound carrier modulated in amplitude with horizontal synchronizing pulse timing information except during the vertical synchronizing interval and a digital video tag interleaved with said horizontal synchronizing pulse timing information, said receivers including authorization register means, sound carrier amplitude demodulator means for recovering said horizontal synchronizing pulse timing information and said digital video tag, vertical detector means connected to said sound carrier amplitude demodulator means for recovering vertical synchronizing timing from the absence of said horizontal synchronizing pulse timing information on said sound carrier, authorization comparator means connected to said digital video tag recovering means and said authorization register means for selectively permitting video reception, and means enabled by said authorization comparator means for increasing the amplitude of said received modulated picture carrier during said horizontal and vertical synchronizing periods relative to said video picture information.

8. A combination as in claim 7 wherein said transmitted wave includes a further signal comprising address and message fields, and wherein said receiver further includes further signal receiving means, an address register, address recognition means responsive to a match between the transmitted address field and the contents of said address register for loading said receiver authorization register with said received message field.

9. A combination as in claim 8 wherein said vertical detector means includes retriggerable monostable circuit means.

10. In combination in video distribution apparatus; signal originating means including means for transmitting a picture carrier selectively modulated in amplitude to reduce vertical and horizontal synchronizing information relative to video picture information, and means for transmitting a sound carrier modulated in amplitude with horizontal synchronizing pulse timing information except during the vertical synchronizing interval; and not bearing vertical interval modulation; and at least one receiver coupled to said signal originating means for receiving said picture and sound carriers, each of said receivers including sound carrier amplitude demodulator means for recovering said horizontal synchronizing pulse timing information, vertical detector means connected to said sound carrier amplitude demodulator means for recovering vertical synchronizing timing from the absence of said horizontal synchronizing pulse timing information on said sound carrier, and means for increasing the amplitude of said received modulated picture carrier during said horizontal and vertical synchronizing periods relative to said video picture information.

11. A combination as in claim 10 wherein said picture carrier transmitting means includes selective carrier variable transmissivity means, sync stripper means for recovering video vertical and horizontal sync timing, and means responsive to the output of said sync stripper means for controlling said variable transmissivity means.

12. A combination as in claim 11 wherein said picture carrier transmitting means further includes an audio frequency modulator for modulating said audio carrier.

13. A combination as in claim 10, 11 or 12 wherein said vertical detector means includes retriggerable monostable circuit means.

14. In combination in receiver means for receiving a composite transmitted wave comprising a picture carrier selectively modulated in amplitude to reduce vertical and horizontal synchronizing information relative to video picture information, and a sound carrier modulated in amplitude with horizontal synchronizing pulse timing information except during the vertical synchronizing interval; and not bearing vertical interval modulation; said receiver means including sound carrier amplitude demodulator means for recovering said horizontal synchronizing pulse timing information, vertical detector means connected to said sound carrier amplitude demodulator means for recovering vertical synchronizing timing from the absence of said horizontal synchronizing pulse timing information on said sound carrier, and means for increasing the amplitude of said received modulated picture carrier during said horizontal and vertical synchronizing periods relative to said video picture information.

15. A combination as in claim 14 wherein said means for recovering vertical synchronizing timing from the absence of said horizontal synchronizing pulse timing information includes a retriggerable one-shot circuit that is reset by said horizontal synchronizing pulse timing information.

* * * * *

UNITED STATES PATENT AND TRADEMARK OFFICE
CERTIFICATE OF CORRECTION

PATENT NO.  : 4,621,285
DATED       : November 4, 1986
INVENTOR(S) : John Schilling, Et al It is certified that error appears in the above-identified patent and that said Letters Patent are hereby corrected as shown below:

Claim 14, Column 9, line 17, after "transmitted" add -- television --.

Signed and Sealed this

Third Day of February, 1987

*Attest:*

DONALD J. QUIGG

*Attesting Officer*     *Commissioner of Patents and Trademarks*